United States Patent [19]

Gruenstern

[11] Patent Number: 5,288,565
[45] Date of Patent: Feb. 22, 1994

[54] SUPPORT EXTENSION FOR FLAT PACK RECHARGEABLE BATTERIES

[75] Inventor: Robert G. Gruenstern, Muskego, Wis.

[73] Assignee: Globe-Union Inc., Milwaukee, Wis.

[21] Appl. No.: 14,784

[22] Filed: Feb. 8, 1993

[51] Int. Cl.⁵ .............................................. H01M 2/02
[52] U.S. Cl. ...................................... 429/153; 429/152; 429/154; 429/159; 429/162; 429/163
[58] Field of Search ................ 429/152, 153, 154, 159, 429/162, 163, 143

[56] References Cited

U.S. PATENT DOCUMENTS 4,055,741  10/1977  Ikari ........................ 429/143
4,360,576  11/1982  Pascon et al. ............... 429/143
4,996,128   2/1991  Aldecoa et al. .

Primary Examiner—Stephen Kalafut
Assistant Examiner—M. Nuzzolillo
Attorney, Agent, or Firm—Foley & Lardner

[57] ABSTRACT

Flat pack rechargeable batteries which include internal support members are disclosed. In the most preferred form of the invention, an intermediate support extender plate is provided. The plate also includes holes to maintain a common path for electrolyte.

14 Claims, 2 Drawing Sheets

SUPPORT EXTENSION FOR FLAT PACK RECHARGEABLE BATTERIES

BACKGROUND OF THE INVENTION

1. Field of the Invention

The present invention relates generally to the art of rechargeable batteries and more particularly to the support of battery elements within a cell casing. Still more specifically, the present invention relates to a device for insuring structural integrity in thicker cells while maintaining a common path for electrolyte flow.

2. Description of the Prior Art

Small rechargeable batteries are becoming increasingly important with the continuing development of portable electronic appliances, such as uninterruptible power systems (UPS). The batteries which are used with such devices are frequently referred to as flat pack batteries. It is highly desirable that such batteries be compact and light in weight yet have a high storage capacity.

Advances have been made in this technology in recent years, even using conventional lead-acid battery technology. Lead-acid batteries typically suffer from weight disadvantages due to the weight of the plate materials (lead plates and lead-containing active materials) and the weight of the containers which are required to hold the plates and electrolyte. Lead-acid batteries, however, have very good power delivery characteristics and may be repeatedly recharged and even overcharged, with only minimal damage to the cells. Moreover, the power curve of lead-acid batteries is relatively predictable. Such features are not readily achievable with other batteries, such as nickel cadmium batteries.

One type of lead-acid battery is the recombinant battery which differs from conventional lead-acid batteries (for example, automobile batteries) in that there is no flowing electrolyte in the system. Substantially all of the electrolyte is maintained in separator material, typically made of a glass fiber mat, located between the plates. The gasses evolved during the electrochemical reactions which take place in lead-acid batteries are absorbed and recombined within the battery rather than being vented in the normal case. With such systems, the battery can be sealed and made maintenance free. Other recombinant systems still use valves to relieve any undesirable build-up of pressure within the cells of the battery.

One recent development in the field of recombinant lead-acid batteries is described in U.S. Pat. No. 4,996,128 issued Dec. 26, 1991 to Aldecoa and Miller entitled "Rechargeable Battery" (hereafter, the "'128 patent"). The battery described in this patent includes a thin plastic casing having generally rectangular top and bottom portions, the casing including lead foil sheets for the positive and negative plates, each foil being pasted with an appropriate active material. Separator layers are placed between the active material. Another embodiment is described, wherein a single positive plate is located at the center of the casing, while two negative plates are disposed on either side, the latter being separated from the positive plate by layers of separator material. Further embodiments are described, including multi-layer batteries of the bipolar variety.

Common features of the batteries described in this patent are a plurality of support members which extend through the plates. The support members in the illustrated embodiments are plastic pins which may extend from one or the other of the casing portions, which pass through the plates and are attached to the opposite casing portion (for example, by vibration welding). Alternatively, pin segments from each casing component may pass partially through the cell and are joined at their tips by an appropriate process such as vibration welding. The support members are provided in a pattern which insures even support and which permits even compression of the battery components when the periphery of the casing portions are sealed. Other recombinant lead-acid batteries are described in the background section of the aforementioned '128 patent. That patent is specifically incorporated herein by this reference.

While the battery systems described in the '128 patent provide advantages over prior art systems, one drawback exists in connection with the creation of thicker multi-plate element stacks within a particular cell. As the thickness of a cell increases, the support capabilities of pins or other similar support members diminish. A solution to this drawback would represent a significant advance in this technology.

SUMMARY OF THE INVENTION

The present invention features a support extender for flat pack rechargeable batteries. The invention further features an extender which may be used with a variety of different support member shapes and in a variety of battery configurations involving from only a few to numerous plates within a particular cell. The invention further features an extender which maintains a common path for electrolyte flow.

How the features of the invention are accomplished will be described in greater detail in the following sections of this specification, taken in conjunction with the figures. Generally, however, they are accomplished by providing a cell extender which includes, in the most preferred form, a flat plate having a plurality of support members extending perpendicularly therefrom. Preferably, the support members are the same shape as those attached to one or the other of the cell outer casing components. A plurality of holes are provided in the plate so that a common flow path for electrolyte is maintained. In a preferred embodiment, the extender includes sockets on the side thereof opposite that from which the support members extend arranged to receive support members which extend from the casing component, or from another cell extender within the cell.

Other ways in which the features of the invention are accomplished will become apparent to those skilled in the art after reading the remainder of this specification.

DESCRIPTION OF THE DRAWINGS

In the various figures, like reference numerals are used to indicate like components.

DETAILED DESCRIPTION OF THE PREFERRED EMBODIMENT

Before proceeding to the detailed description of the drawings, several general comments are warranted with regard to the scope and applicability of the present invention. First, while only a single extender is shown for a battery cell, a plurality of the extenders could be used if a large number of positive and negative plates were to be employed in a particular cell configuration. The more extenders, the shorter the support members need to be for a given height and the greater the structural rigidity which can be expected. Moreover, while sockets are shown for the support members, they are not required, and the ends of support members may be attached directly to a battery surface.

Second, the plate materials (preferably lead foil), active materials, separator materials and electrolyte are not described in detail, but they can readily be selected from those well known to the art, including those described and illustrated in the '128 patent.

Third, it should be recognized that the individual cells which are the subject of this invention can, themselves, be combined with other cells to build a stacked battery of higher voltage. And finally, the preferred resin material for the components of FIG. 1 is ABS (acrylonitrile-butadiene-styrene), but other moldable, thermoplastic resins (e.g., polycarbonates or high density polyethylene) could certainly be substituted therefor.

Figure 1:
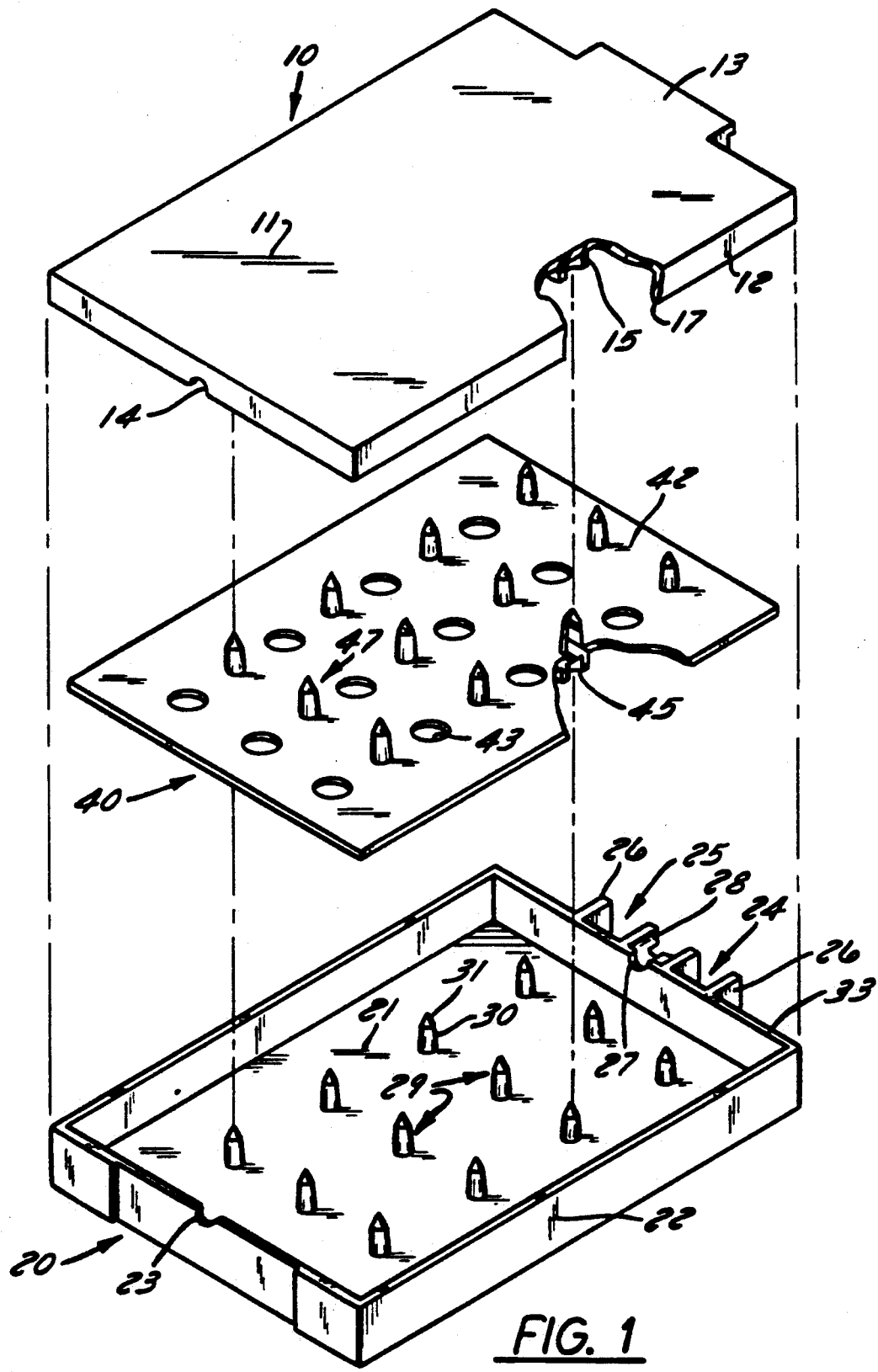
FIG. 1 is a perspective exploded view of battery casing components and the support extender according to the most preferred form of the present invention.

FIG. 1 is an exploded view showing a preferred embodiment of the present invention to include three major components, an upper battery casing 10, a lower battery casing 20 and an intermediate support extender 40. The upper casing 10 includes a generally planar top 11 having a depending wall 12 defining an open bottom, generally rectangular casing half. A portion of top 11 and wall 12 is expanded at the area designated 13 to accommodate battery terminals and vents, which in and of themselves do not form part of the present invention. At the end of casing 10 opposite from area 13 is a semicircular opening 14 representing one-half of a fill hole used to add electrolyte to the battery once it is fully assembled.

The interior surface of top 11 includes a plurality of annular sockets 15, the number and location of which will become apparent as the description continues. Sockets 11 are arranged to receive the ends of certain support members to be described in the ensuing paragraphs.

Referring next to the lower battery casing 20, it contains a generally planar bottom 21 and a surrounding wall 22. Wall 22 includes a semicircular fill opening 23 arranged and adapted to mate with opening 14 when the top and bottom casings are assembled. Wall 22 also includes a pair of terminal tab channels 24 and 25 defined by a plurality of extensions 26 which are located perpendicular to wall 22 at the end thereof opposite fill opening 23. A vent opening 27 is provided between the channels 24 and 25, and on the outside of wall 22 a semicircular cradle 28 is provided for receiving an elastomeric burp valve, known in the battery art as a Bunsen Cap.

Bottom casing 20 also includes a plurality of support pins 29, each including a generally cylindrical body 30 and a conical point 31. Preferably, pins 29 are integral with the casing 20 and are molded therewith. Support members could also be tapering conical support members or they could be formed in other shapes, such as those having a square or rectangular cross-section. If other shapes were chosen, the sockets described herein would be reconfigured to receive them. The number of pins 29 is a matter of design choice, but they should be sufficient in number and should be located in a pattern to provide generally uniform support for battery elements which will be placed thereover during assembly of the cell. Such assembly is accomplished, for example, by vibration welding the lower edge 17 of top 20 to the upper edge 33 of wall 22, thereby providing a box-like enclosure.

It should be noted that in the present invention, pins 29 do not extend into sockets 15. Rather, intermediate support extender 40 is provided between casings 10 and 20. Extender 40 is a generally rectangular plate 42 having a plurality of holes 43 passing therethrough. The number of holes is not critical to the invention, but sufficient holes are needed to provide a free flow path for electrolyte from one side of plate 42 to the other. The lower side of plate 42 includes a plurality of sockets 45, shaped generally the same as sockets 15 and arranged in number and spacing to fit over the upper ends of pins 29. In the illustrated embodiment, there would be twelve sockets 45. Extender 40 also includes a plurality of pins 47 which, preferably, are the same shape as pins 29. In the illustrated embodiment, twelve pins 47 are provided in the same pattern as pins 29. In turn, there would be twelve sockets 15 located in the lower surface of top 11 described previously.

From the foregoing description, it will be appreciated that the battery casing is assembled by placing element 40 onto pins 29, after the battery elements have been added, so that the tips 31 thereof are received within sockets 45. Pins 47 in turn are received by sockets 15, after further battery element additions, as the top casing 10 is lowered to permit engagement of the edges 17 and 33. Vibration welding will then achieve the desired structural rigidity which is the primary feature of the present invention. Alternatively, extender 40 could be vibration welded to the casing 20 before casing 10 is added and welded in place.

Figure 2:
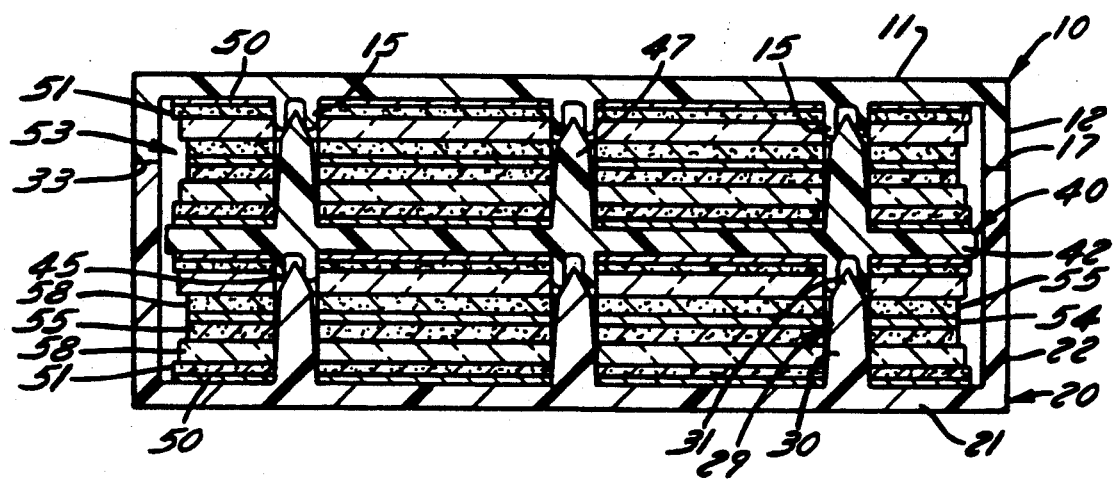
FIG. 2 is a cross-sectional view of an illustrative cell, including the components of FIG. 1 and electrodes and separator material.

FIG. 2 is a sectional view illustrating an exemplary cell configuration employing the present invention. Located both above and below extender 40 are electrode groupings each including outer lead foil sheets 50 pasted with negative active material 51. A positive electrode 53 including a foil sheet 54, pasted on both sides with positive active material 55, is located at the center of the grouping. A separator, such as a glass mat separator 58, is located between the positive electrode 53 and each of the negative electrodes. The number of plates can be widely varied as referred to in the aforementioned '128 patent. Electrolyte is added through the fill hole discussed above and the hole is sealed in a conventional manner.

It will now be appreciated that flat pack batteries having greater thickness and efficient support can be provided by use of one or more intermediate battery plate extenders 40.

The present invention has been described in connection with a single preferred embodiment but is not to be limited thereby, but is to be limited only by the scope of the claims which follow.

I claim:

1. A rechargeable lead-acid battery comprising upper and lower casings, a plurality of support members attached to one of the casings and extending toward the other casing, the support members including an upper end, a non-conductive plate located between the casings, openings being provided in the plate and support members attached to the intermediate plate and extending perpendicularly therefrom and having upper ends, the casing support members bridging the casing member and the plate and being attached to the plate, and the support members extending from the plate bridging the plate and the other casing and being attached thereto, the battery further including electrode elements disposed on either side of the plate.

2. The battery of claim 1 wherein the lead-acid battery is of the recombinant type.

3. The battery of claim 1 wherein the casings and intermediate plate are formed from a thermoplastic, moldable resin and wherein the support members are formed integrally therewith.

4. The battery of claim 1 wherein sockets are provided in the other casing and arranged to receive the upper ends of the support members extending from the plate.

5. The battery of claim 1 wherein sockets are provided on plate on the side thereof opposite the side from which its support members extend, the sockets being arranged to receive the upper ends of the support members extending from a casing.

6. The battery of claim 1 wherein both casings include a planar portion surrounded by a wall, the wall surrounding the upper casing having a lower edge and the wall surrounding the lower casing having an upper edge, the upper and lower edges being joined.

7. The battery of claim 1 wherein a plurality of intermediate plates are provided between the upper and lower casings, said intermediate plates being arranged parallel to one another.

8. The battery of claim 1 wherein the support members are pins having a cylindrical body and conical upper ends.

9. A recombinant lead-acid battery including upper and lower casing elements, said casing elements having a planar surface and a surrounding wall, the walls being arranged to form an enclosure when confronting edges thereof are joined together;

a plurality of electrode elements disposed between the upper and lower casing elements, the electrodes including conductive substrates pasted with negative active paste material and conductive substrates pasted with positive active material;

separators located between adjacent electrodes;

electrolyte absorbed in the separators;

a plurality of support members extending perpendicularly from one of the casing elements toward the other casing element, the length of the support members being less than the distance between the planar surfaces;

a plate located between and parallel to the planar surfaces of the casing elements and between at least some the electrodes, the plate having openings therein establishing a common flow for electrolyte, a plurality of support members extending from the plate and attached to the casing element from which support members do not extend; and the surface of the plate opposite that from which its support members extend being joined to the upper ends of the support members extending from the casing element.

10. The battery of claim 9 wherein the support members are pins having conically shaped upper ends.

11. The battery of claim 9 wherein sockets for receiving the upper ends of the support members are formed in the surface of the plate opposite that from which its support members extend and in the casing element adapted to receive the upper ends of the support members extending from the plate.

12. The battery of claim 9 wherein the casing and plate are formed of a thermoplastic, moldable resin and wherein the support members are joined to their respective surfaces by vibration welding.

13. The battery of claim 9 wherein the positive and negative electrodes include lead foil substrates.

14. The battery of claim 9 wherein a plurality of plates are provided between the casing elements.

* * * * *